United States Patent [19]

Morrison

[11] Patent Number: 5,100,633

[45] Date of Patent: * Mar. 31, 1992

[54] METHOD FOR SCRUBBING POLLUTANTS FROM AN EXHAUST GAS STREAM

[75] Inventor: Garrett L. Morrison, Unity, Me.

[73] Assignee: Passamaquoddy Technology Limited Partnership, Portland, Me.

[*] Notice: The portion of the term of this patent subsequent to Aug. 22, 2006 has been disclaimed.

[21] Appl. No.: 604,322

[22] Filed: Oct. 25, 1990

Related U.S. Application Data

[63] Continuation of Ser. No. 359,213, May 31, 1989, abandoned, which is a continuation-in-part of Ser. No. 97,639, Sep. 16, 1987, abandoned, which is a continuation-in-part of Ser. No. 904,719, Sep. 5, 1986, Pat. No. 4,716,027, which is a continuation-in-part of Ser. No. 890,991, Jul. 25, 1986, Pat. No. 4,708,855, which is a continuation-in-part of Ser. No. 796,075, Nov. 7, 1985, abandoned.

[51] Int. Cl.5 .................................................. B01D 53/34
[52] U.S. Cl. ................................... 423/225; 423/232; 423/235; 423/240 R; 423/242; 423/246
[58] Field of Search ............... 423/225, 232, 234, 235, 423/240 R, 240 S, 241, 246, 247, 244 R, 244 A, 239, 239 A, 242 R, 242 A

[56] References Cited

U.S. PATENT DOCUMENTS

| Re. 33,031 | 8/1989 | Morrison | 423/232 |
|---|---|---|---|
| 2,701,193 | 2/1955 | Heudier et al. | 71/37 |
| 2,955,910 | 10/1960 | Findlay | 423/225 |
| 3,507,482 | 4/1970 | Kraszewski et al. | 263/32 |
| 3,533,748 | 10/1970 | Finfer et al. | 423/242 |
| 3,687,613 | 8/1972 | Rickard | 423/242 |
| 3,733,779 | 5/1973 | Bellisio et al. | 423/242 |
| 3,784,389 | 1/1974 | Hastrap | 106/100 |
| 3,880,597 | 4/1975 | Goldschmidt et al. | 23/283 |
| 3,897,540 | 7/1975 | Onnen | 423/242 |
| 3,929,968 | 12/1975 | Taub | 423/246 |
| 4,002,724 | 1/1977 | McKie | 423/242 |
| 4,019,444 | 4/1977 | Kleeberg et al. | 423/240 |
| 4,081,513 | 3/1978 | Moss | 423/244 |
| 4,100,259 | 7/1978 | Salaun et al. | 423/242 |
| 4,115,136 | 9/1978 | Hansen | 106/100 |
| 4,150,096 | 4/1979 | Nelms et al. | 423/242 |
| 4,155,977 | 5/1979 | Baker | 422/62 |
| 4,156,712 | 5/1979 | Kanai et al. | 423/242 |
| 4,164,547 | 8/1979 | Simko | 423/242 |
| 4,173,487 | 11/1979 | Cohen | 106/103 |
| 4,181,506 | 1/1980 | Bengtsson | 423/242 |
| 4,195,062 | 3/1980 | Martin et al. | 422/168 |
| 4,197,278 | 4/1980 | Gehri et al. | 423/242 |
| 4,208,381 | 6/1980 | Isahaya et al. | 423/210 |
| 4,208,383 | 6/1980 | Kisters et al. | 423/215.5 |
| 4,228,139 | 10/1980 | Johnson | 423/242 A |

(List continued on next page.)

OTHER PUBLICATIONS

Kohl et al., *Gas Purification*, 3rd Ed., Gulf Publishing Co., 1979, pp. 320-324.

(List continued on next page.)

*Primary Examiner*—Jeffrey E. Russel
*Attorney, Agent, or Firm*—Kenyon & Kenyon

[57] ABSTRACT

Method of treatment of a hot exhaust gas stream containing acid forming pollutants to produce a scrubbed exhaust and useful or benign by-products. The gas stream is first passed through a heat exchanger and then reacted with an aqueous, alkaline scrubbing solution. After the reaction the solution, now containing dissolved salts with a precipitate of any insolubles, is passed through the heat exchanger wherein it is heated by the gas stream to remove water therefrom, thereby crystallizing the dissolved salts, and wherein it serves to cool and dehumidify the gas stream in a manner to remove heat and collect water therefrom prior to its reacting with the scrubbing solution. Any remaining insolubles are non-toxic or useful, e.g. as cement kiln feed.

7 Claims, 2 Drawing Sheets

U.S. PATENT DOCUMENTS

| | | | |
|---|---|---|---|
| 4,246,242 | 1/1981 | Butler et al. | 423/210 |
| 4,247,321 | 1/1981 | Persinger | 423/235 |
| 4,263,264 | 4/1981 | Ikeda et al. | 423/239 |
| 4,276,272 | 6/1981 | Schlager et al. | 423/244 |
| 4,279,873 | 7/1981 | Felsrang et al. | 423/242 |
| 4,297,332 | 10/1981 | Tatani et al. | 423/240 |
| 4,302,425 | 11/1981 | Gamel | 423/522 |
| 4,323,371 | 4/1982 | Ritranen | 423/242 |
| 4,324,770 | 4/1982 | Bakke | 423/242 |
| 4,325,713 | 4/1982 | Rosenberg et al. | 423/242 |
| 4,344,920 | 8/1982 | Isserlis | 423/244 |
| 4,355,013 | 10/1982 | Bechthold et al. | 423/242 |
| 4,366,133 | 12/1982 | Rader et al. | 423/242 |
| 4,397,742 | 8/1983 | Minnick | 423/244 |
| 4,446,109 | 5/1984 | Bakke | 423/168 |
| 4,452,766 | 6/1984 | Pike | 423/242 |
| 4,469,033 | 9/1984 | Michelfelder et al. | 110/344 |
| 4,508,573 | 4/1985 | Harris | 106/100 |
| 4,519,995 | 5/1985 | Schrofelbauer et al. | 423/244 |
| 4,555,390 | 11/1985 | Bhatia | 423/242 |
| 4,559,211 | 12/1985 | Feldman et al. | 423/242 |
| 4,584,022 | 4/1986 | Cohen | 106/100 |
| 4,590,047 | 5/1986 | Donnelly et al. | 423/242 |
| 4,600,438 | 7/1986 | Harris | 106/100 |
| 4,634,583 | 1/1987 | Wolter et al. | 423/244 |
| 4,708,855 | 11/1987 | Morrison | 423/235 |
| 4,716,027 | 12/1987 | Morrison | 423/225 |
| 4,915,914 | 4/1990 | Morrison | 422/168 |

FOREIGN PATENT DOCUMENTS

| | | | |
|---|---|---|---|
| 46881 | 11/1979 | Australia . | |
| 5301 | 11/1979 | European Pat. Off. . | |
| 88551 | 9/1983 | European Pat. Off. . | |
| 137128 | 4/1985 | European Pat. Off. . | |
| 1174681 | 7/1964 | Fed. Rep. of Germany . | |
| 2166471 | 5/1974 | Fed. Rep. of Germany . | |
| 2706929 | 8/1978 | Fed. Rep. of Germany . | |
| 2753209 | 11/1978 | Fed. Rep. of Germany | 423/242 A |
| 3015977 | 11/1981 | Fed. Rep. of Germany . | |
| 3325140 | 7/1983 | Fed. Rep. of Germany . | |
| 3339111 | 10/1983 | Fed. Rep. of Germany . | |
| 3308927 | 9/1984 | Fed. Rep. of Germany . | |
| 3408702 | 9/1984 | Fed. Rep. of Germany . | |
| 3415210 | 7/1985 | Fed. Rep. of Germany . | |
| 3415140 | 10/1985 | Fed. Rep. of Germany . | |
| 3535721 | 4/1986 | Fed. Rep. of Germany . | |
| 2127665 | 10/1972 | France . | |
| 2189101 | 1/1974 | France . | |
| 2205354 | 5/1974 | France . | |
| 213358 | 9/1984 | German Democratic Rep. . | |
| 247587 | 7/1987 | German Democratic Rep. . | |
| 45-1168 | 1/1970 | Japan . | |
| 52-32001 | 3/1977 | Japan . | |
| 54-20031 | 2/1979 | Japan . | |
| 55-27044 | 2/1980 | Japan . | |
| 85164 | 8/1977 | Poland . | |
| 147408 | 5/1989 | Poland . | |
| 425743 | 6/1967 | Switzerland . | |
| 738645 | 6/1980 | U.S.S.R. . | |
| 642 | of 1749 | United Kingdom | 423/207 |
| 2129 | of 1796 | United Kingdom | 423/207 |
| 111845 | 11/1918 | United Kingdom . | |
| 396969 | 8/1933 | United Kingdom | 423/242 A |
| 1380869 | 1/1975 | United Kingdom . | |
| 1450672 | 9/1976 | United Kingdom . | |
| 2014975 | 9/1979 | United Kingdom . | |
| 2021086 | 11/1979 | United Kingdom . | |
| 1589999 | 5/1981 | United Kingdom . | |
| 2078702 | 1/1982 | United Kingdom . | |
| 2095655 | 10/1982 | United Kingdom . | |
| 2152487 | 8/1985 | United Kingdom . | |
| 3215 | 6/1987 | World Int. Prop. O. . | |

OTHER PUBLICATIONS

Lauer et al., *Chemical Engineering Techniques*, Reinhold Publ. Co., 1952, pp. 220–222.

Olsen, *Unit Processes and Principles of Chemical Engineering*, O. Van Nostrand Co., 1932, pp. 1–3.

M. Mehlmann, *Lime Products for Waste Gas Cleaning*, Zement-Kalk-Gips at 42, (1985).

Poradnik Technology Cementowego, Arkady, p. 402, (1981).

L. V. Hillier, *Flue Gas Desulfurization (FGD) by Fly Ash*, Proceedings of the Fifth Annual Industrial Air Pollution Control Conference, p. 434, (1975).

N. J. Stevens et al., *R-C/Bahco for Combined Sulfur Dioxide and Particulate Control*, 95 Chemical Abstracts, 304, (1981).

K. Muramatsu et al., *Development of Mitsubishi Wet Flue Gas Desulfurization System*, Chemical Economy & Engineering Review, vol. 16, pp. 15–22, (1984).

M. Esche, *Stack Gas Desulfurization Without Reheating*, 4 Third European Coal Utilisation Conference, p. 93, (1983).

A. N. Balobolkin et al., *Wet Treatment of Waste Gases from Rotary Kilns*, 103 Air Pollution, Ind. Hyg., 307–08, (1985).

D. S. Ensor et al., *Evaluation of the Ceilcote Ionizing Wet Scrubber*, 6 Environment Int'l., 25, (1982).

F. T. Princiotta, *Advances in Sulfur Dioxide Stack Gas Scrubbing*, 74 Chemical Engineering Process, 58, (1978).

M. R. Gogineni et al., *Sulfur Oxides Removal by Wet Scrubbing Application to Utility Boilers*, Proceedings: Frontiers of Power Technology, pp. 5–1 to 5–30, (1975).

Perry and Chilton, eds., *Chemical Engineers' Handbook*, 5th ed., pp. 11–27, 11–30, 11–31, 11–36, (1986), (Tab 64) discloses evaporators and heat transfer in.

Saarbergwerke AG, *Removal of Sulphur Dioxide from Flue Gases by Water Scrubbing with Neutralization Using Alkaline Fly Ash*, Chemical Engineering, p. 2, Week A13, DT 2642-326, (1976).

C. Still, *Desulphurising Industrial Gases by Adsorption with Alkaline Earth Carbonate or Hydroxide Solutions*, Chemical Engineering, p. 4, Week S24, DT 1961048, (1971).

A. Schaue et al., *Intensification of the IfE Process for Flue Gas Desulfurization*, 107 Chemical Abstracts, 408, (1987).

C. J. Santhanam et al., *Utilization of Wester Fly Ash in Wet Scrubbing FGD Processes*, 103 Chemical Abstracts, 290, (1985).

C. A. Johnson, *Minnesota Power's Operating Experience with Integrated Particulate and Sulfur Dioxide Scrubbing*, 95 Air Pollution, Ind. Hyg., 299, (1981).

C. A. Johnson, *Economic Benefits of Using Flyash as an Alkali for Sulfur Dioxide Removal Systems*, 92 Air Pollution, Ind. Hyg., 251, (1980).

H. E. Hesketh, *Reduce Sulfur Dioxide Emissions Using Fly Ash Slurries*, 89 Air Pollution, Ind. Hyg., 271, (1978).

P. H. Tufte, *Pilot Plant Scrubber Tests to Remove Sulfur Dioxide Using Solluble Alkali in Western Coal Fly Ash*, 82 Air Pollution, Ind. Hyg., 317, (1975).

(List continued on next page.)

OTHER PUBLICATIONS

G. D. Reed, *Analysis of Coal Fly Ash Properties of Importance to Sulfur Dioxide Reactivity Potential,* 101 Chemical Abstracts, 264, (1984).

*Scrubbing of Flue Gases Using Alkali from Fly Ash,* 94 Chemical Abstracts, 342, (1981).

H. I. Zeliger, *Powder from Western Coal: Fly Ash as a Reagent for Sulfur Dioxide Scrubbing,* 89 Chemical Abstracts, 354, (1978).

Schroeder et al., *Absorption of Sulfur Dioxide from Waste Gases,* 102 Chemical Abstracts, 308, (1985).

G. T. Rochelle et al., *Buffer Additives for Lime/Limestone Slurry Scrubbing Synthesis, Mass Transfer and Degradation,* 101 Chemical Abstracts, 295, (1984).

B. Leimkuehler, *Flue Gas Desulfurization and Gypsum Recovery According to the Bischoff Process,* 102 Chemical Abstracts, 279, (1985).

U. Mohn, *Steinmueller Flue Gas Desulfurization,* 102 Chemical Abstracts, 279, (1985).

J. Klingspor, *Similarities Between Lime and Limestone in Wet-Dry Scrubbing,* 102 Chemical Abstracts, 413, (1985).

R. Uhlrich et al., *Buffer Additives for Lime/Limestone Slurry Scrubbing,* 101 Chemical Abstracts, 316, (1984).

Y. C. Lee et al., *An XPS Study of the Interaction of Sulfur Dioxide with Calcium Oxide,* 101 Chemistry Abstracts, 333, (1984).

R. Wieser, *Water-Tube Boiler with Integrated Flue Gas Desulfurization,* 101 Chemical Abstracts, 337, (1984).

T. A. Burnett et al., *Economic Evaluation of Limestone and Lime Flue Gas-Desulfurization Processes,* 99 Chemistry Abstracts, (1983).

M. Sten, *Current Methods for Treating Contaiminated Flue Gas from Coal Firing,* 99 Chemical Abstracts, (1983).

*Method and Apparatus for Removal of Sulfur Dioxide from Flue Gases,* 99 Chemical Abstracts, 293, (1983).

A. Wendorf et al., *Wet Sulfur Dioxide Removal Operating Experience at Cincinnati Gas and Electric Company's East Bend Station,* 98 Chemical Abstracts, 321, (1983).

O. Hargrove et al., *Effects of Process-Water Selection on Lime-Limestone Flue Gas Desulfurization Chemistry,* 98 Chemical Abstracts, 327, (1983).

H. T. Karlsson, *Activated Wet-Dry Scrubbing of Sulfur Dioxide,* 98 Chemical Abstracts, (1983).

C. Laohavichitra, *Absorption of Sulfur Dioxide by Calcium Hydroxide Solution in a Wetted-Wall Column,* 98 Chemical Abstracts, 123, (1983).

G. T. Rochelle, *Buffer Additives for Lime/Limestone Slurry Scrubbing,* 97 Chemical Abstracts, 357, (1982).

B. J. Lin, *Solid-Gas Equilibrium in Calcium Sulfite-Water(Gas)/System and Lewis Acid-Base Alloys,* 96 Chemical Abstracts, 357, (1982).

S. Janusz, *Removal of Sulfur Oxides from Lue Gases by the Wet Limestone Method,* Chemical Abstracts, 95:208784c, (1981).

G. L. Crow, *Corrosion in Lime/Limestone Slurry Scrubbers for Coal-Fired Boiler Flue Gases,* 95 Chemical Abstracts, 311, (1981).

(List continued on next page.)

OTHER PUBLICATIONS

S. C. Wang, *EPA Alkali Scrubbin Test Facility*, Chemistry Abstracts, 94:179753, (1981).

B. A. Laske, *Survey of Flue Gas Desulfurization Systems*, 93 Chemical Abstracts, 313, (1980).

P. E. Jeffers, *Ionizing Wet Scrubber Keeps Globe Refractories in Compliance*, 93 Chemical Abstracts, 427, (1980).

T. C. Ponder et al., *Status of Flue Gas Desulfurization Systems for Industrial Boilers*, Chemistry Abstracts, 91:145193, (1979).

J. E. McCarthy, *The Research-Cottrell/Bahco Sulfur Dioxide and Particulate Removal System at Rickenbacker Air Force*, 89, Chemical Abstracts, 284, (1978).

C. Wen et al., *Absorption of Sulfur Dioxide in Lime and Limestone Slurry*, 89 Chemical Abstracts, 330, (1978).

M. Amano et al., *Pilot Plant for a Wet Simultaneous Sulfur Oxides and Nitrogen Oxides Removal Process Using Lime and Limestone Scrubbing*, 88 Chemical Abstracts, 284, (1978).

F. G. Shinskey, *The pH Controls for Sulfur Dioxide Scrubber*, 87 Chemical Abstracts, 241, (1977).

C. Y. Wen et al., *Analysis and Simulation of Recycle Sulfur Dioxide-Lime Slurry in Turbulent Contact Absorber Scrubber System*, 87 Chemical Abstracts, 284, (1977).

Chemical Abstracts, 93:225032, (1980).

METHOD FOR SCRUBBING POLLUTANTS FROM AN EXHAUST GAS STREAM

This is a continuation of copending application Ser. No. 07/359,213, filed on May 31, 1989, now abandoned which in turn is a continuation-in-part of application Ser. No. 07/097,639, filed on Sept. 16, 1987, now abandoned, which in turn is a continuation-in-part of application Ser. No. 904,719, filed on Sept. 5, 1986, issuing as U.S. Pat. No. 4,716,027 on Dec. 29, 1987, which in turn is a continuation-in-part of application Ser. No. 890,991, filed on July 25, 1986, issuing as U.S. Pat. No. 4,708,855 on Nov. 29, 1987, which in turn is a continuation-in-part of application Ser. No. 796,075, filed on Nov. 7, 1985, now abandoned.

This invention relates to method and apparatus for scrubbing pollutants from an exhaust gas stream whereby the materials reacted with the stream are rendered at east benign and in many cases converted by the reaction into useful products.

BACKGROUND OF THE INVENTION

Scrubbing of exhaust gas pollutants is generally costly, having significant environmental returns but little or no economic returns unless it is possible to convert by the scrubbing otherwise waste products into useful products. The cost of the initial equipment is high. Furthermore, the materials for scrubbing, such as the oxides, carbonates, or hydroxides of alkali and/or alkaline earth metals are a continuing expense. In addition, disposal of the reaction products derived from reaction of the scrubbing materials with the exhaust gas adds to the continuing cost, especially if the products contain toxic components. Because of the expense of operating these pollution control devices, there has been a tendency to avoid scrubbing of flue gas and reduction of release of atmospheric pollutants where possible, and to reduce operating costs where scrubbing is required.

Therefore, in scrubbing systems based on use of alkaline scrubbing materials, there has been a significant effort to minimize the amount of scrubbing reactant used to thereby minimize the cost of raw material and the cost of disposal of spent reactant.

The majority of scrubbing processes utilize limestone as a reactant for combination with sulfur dioxide in flue gas where calcium carbonate is converted to calcium sulfite or sulfate plus carbon dioxide. Aside from the cost for limestone as reactant and the cost for disposal of reacted limestone (scrubber sludge), is the concern for increased release of carbon dioxide into the atmosphere as a result of scrubbing processes. In effect, reduction of one atmospheric pollutant (sulfur dioxide) results in the increase of another (carbon dioxide) plus generation of solid waste.

Lime and limestone based scrubbing processes have been beneficial in their ability to reduce sulfur dioxide pollution, but have had a negative economic impact on the user and have negative environmental impact.

A growing number of boiler installations are fueled by combustion of biologic materials (hereinafter collectively "biomass"), including wood, peat, or crop residue, where there is little or no production of sulfur oxides and therefore no scrubbing of the gaseous components of the exhaust is needed or done. On the other hand, the ash produced from these operations contains significant alkali and alkaline earth metal salts, occurring commonly as the oxide, or, if wetted and/or reacted with carbon dioxide, as the hydroxide or the carbonate, or perhaps as hydrated salts thereof.

I have discovered that ash from boiler installations containing a significant proportion of alkali and alkaline earth metal oxides, hydroxides, and/or carbonates can be used in a process for scrubbing exhaust gas in place of the usual materials above referred to, thus making use of an otherwise waste product as a substitute for expensive materials which must be purchased and allowing for recovery of valuable alkali metal salts to offset the operating cost. Use of ash containing alkali and alkaline earth oxides allows consumption of carbon dioxide from the flue gas during the scrubbing process as alkali and alkaline earth carbonates are formed.

In cases where the facility producing the ash does not itself also have a boiler installation producing an exhaust of high sulfur content in need of scrubbing, the ash could be transported to other boiler installations which have such a problem, or to installations where use of a higher sulfur content fuel would provide an economic benefit. In addition, because ash derived from biomass material generally contains potassium and other alkali and alkaline earth metal salts recoverable by utilization of the exhaust gas heat or other waste heat sources, the resulting alkali and alkaline earth metal salts can be a valuable by product of the process.

Other materials are also usable for this purpose. Industrial or municipal waste, incinerator ash or by-products which contain potassium or sodium or other soluble salts which, when dissolved in water yield a basic (high pH) solution and when recovered from the waste or by-product, provide an economic benefit are also suitable.

These ash materials generally contain potassium and/or sodium which will react with sulfur dioxide to form a soluble compound which can be selectively separated from other ash components and recovered as a valuable by-product. The other ash components are those that were initially insoluble or those that were rendered insoluble by the process.

In the following specification and claims, ash derived from burning biomass material and industrial or municipal wastes or other by-products, usable in the process herein described and claimed, are collectively identified by the generic term, "ash."

Reacted ash from the process may have a number of beneficial uses depending on the initial composition of the ash used and on the selected mode of operation of the process. There are two extremes of the mode of operation. One is operation wherein potassium and sodium are the prime reactants within the ash that combine with sulfur compounds from the flue gas. The other is operation wherein sodium, potassium, and calcium or other alkaline earth metals are all allowed to combine with sulfur compounds from the flue gas.

In the first instance, several benefits are obtained. Ash consumption is maximized thereby eliminating a waste. Alkali metal sulfate production is maximized thereby maximizing income from operation. Alkaline earth metals are precipitated as the carbonate thereby resulting in innocuous solids (primarily calcium carbonate) residue, and scrubbing of carbon dioxide from (rather than addition of carbon dioxide to) the flue gas.

In the second instance, ash consumption is minimized. A waste is still eliminated. Alkali metal sulfate production is minimized, however it still provides significant operating income. Alkaline earth metals are precipitated as the sulfate rather than the carbonate and may have to be disposed of in a landfill. In that case the disposed material is a non-polluting material in that it has had the soluble components fraction removed by the process.

In practice, for each user of the process, there will be a balance between these two extremes where income is maximized and waste minimized to fit conditions of ash availability and waste utilization-disposal options.

Spent scrubbing reactant may be used as raw material feed for a cement kiln in situations where transport costs are acceptable. In other situations, the spent material may have to be landfilled. The material will, however, no longer be a caustic material and should, in most cases, be disposable as benign common fill.

BRIEF SUMMARY OF THE INVENTION

This invention provides a process that allows extraction of a portion of the alkali and akaline earth metal salts present in ash so that the alkali and alkaline earth metals can be recovered as a saleable product, and at the same time uses the ash as a scrubbing reactant for removing the acidic oxides of sulfur, nitrogen and other acidic gaseous pollutants from the exhaust stream. The pollutants include the oxides of sulfur and nitrogen and those gases which, when dissolved in or reacted with water, produce an acid. Included in those gases are the compounds of the halogens and/or their oxides. More specifically the process will react ash with acids produced from the oxides of sulfur, nitrogen and carbon and from the compounds of halogens and their oxides to dissolve some components of the ash and render the remaining undissolved components benign as non-caustic material; scrub a portion of the oxides of sulfur, nitrogen, and carbon, and the compounds of halogens and their oxides from the exhaust stream and make them available for reaction with the ash; produce as a by-product alkali and alkaline earth metal salts composed of components derived from the ash and from the exhaust stream; and utilize heat in the hot exhaust stream to remove water from the process stream containing the dissolved alkali and alkaline earth metal salts to allow their recovery as the solid salt. Because the alkali metal salts are valuable, the process economics are most beneficial when ash use is maximized.

In accordance with the invention there is provided a novel method of treatment of a hot exhaust gas stream containing as pollutants at least one of the acidic oxides of sulfur, nitrogen, carbon, and halogen compounds, for producing scrubbed exhaust and useful or benign by-products.

The method comprises providing a basic aqueous slurry of ash which contains alkali and alkaline earth metal salts, reacting the exhaust gas stream with the slurry in a manner to scrub the exhaust gas stream and to cause the pollutants therein to react with the water in the slurry to produce acids, allowing the said acids to react with any oxides, hydroxides and carbonates of alkali and alkaline earth metal salts contained in the slurry thereby to produce a solution with a precipitate of any insolubles of alkali and alkaline earth metal salts comprising at least one of halogen compounds, carbonate, sulfate, sulfite, nitrate and nitrite of calcium, magnesium, potassium and sodium in the slurry, recovering those salts from the solution and expelling the scrubbed exhaust gas stream.

The invention includes the method of treatment of a gas stream containing acid forming pollutants to produce a scrubbed exhaust comprising cooling and dehumidifying the gas stream in a manner to remove heat and collect water therefrom, reacting the cooled and dehumidified gas stream with an aqueous, alkaline scrubbing solution, recovering the scrubbing solution after such reaction as a solution including dissolved salts with a precipitate of any insolubles, and heating the latter solution, using heat collected during cooling and dehumidifying to remove water therefrom thereby crystallizing the dissolved salts.

In preferred methods, liquid is evaporated from the recovered scrubbing solution and then recondensed; the dissolved salts include alkali and alkaline earth metal salts; the slurry also contains undissolved components and the method further includes the step of separating the solution of alkali and alkaline earth metal salts from the undissolved components and the step of transferring the solution of alkali and alkaline earth metal salts and the said undissolved components to a separation system wherein the solution of salts is separated from the undissolved components; the exhaust gas stream is passed through a heat exchanger prior to reacting it with the slurry, the separated salt solution being simultaneously passed through the heat exchanger wherein it extracts heat and moisture from the exhaust gas stream prior to its reaction with the slurry.

In presently preferred methods the solution of akali and alkaline earth metal salts is separated from the precipitate and insoluble material preferably by transferring the solution of alkali and alkaline earth metal salts and precipitate with the insolubles to a settling tank or separation system wherein the salt solution is separated from said precipitate and insoluble compounds; the gas stream is dehumidified by cooling prior to the passing step, preferably by using the salt solution to cool and dehumidify it and the moisture therefrom is used as part of the make-up water for the process.

In presently most preferred methods, the heat for removing water from the salt solution is derived in part from each of the hot exhaust gas, the latent heat of moisture in the said exhaust, the hydration reaction between ash or material and water, and from compressing the gas prior to said passing step, and the dissolved solids contained in the salt solution have become suitable for use as fertilizer or as raw material for extraction of chemicals.

Still further objects, features and advantages of the invention will be apparent from the following detailed description of a presently preferred method and apparatus for practicing the same taken in conjunction with the accompanying drawing.

DETAILED DESCRIPTION OF PREFERRED EMBODIMENT AND METHOD

Figure 1:
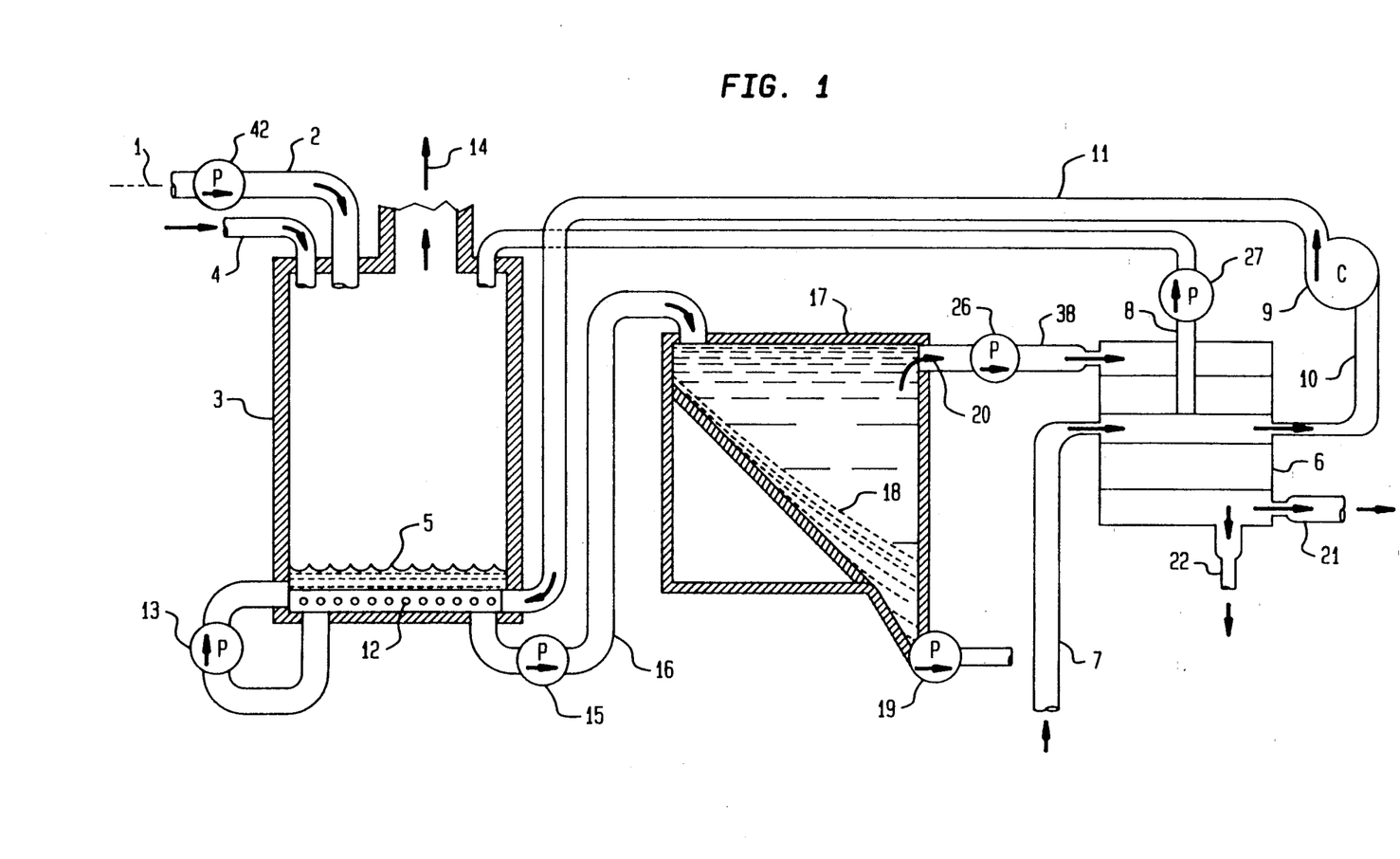
FIG. 1 is a schematic representation of one apparatus for practicing the invention.
Figure 2:
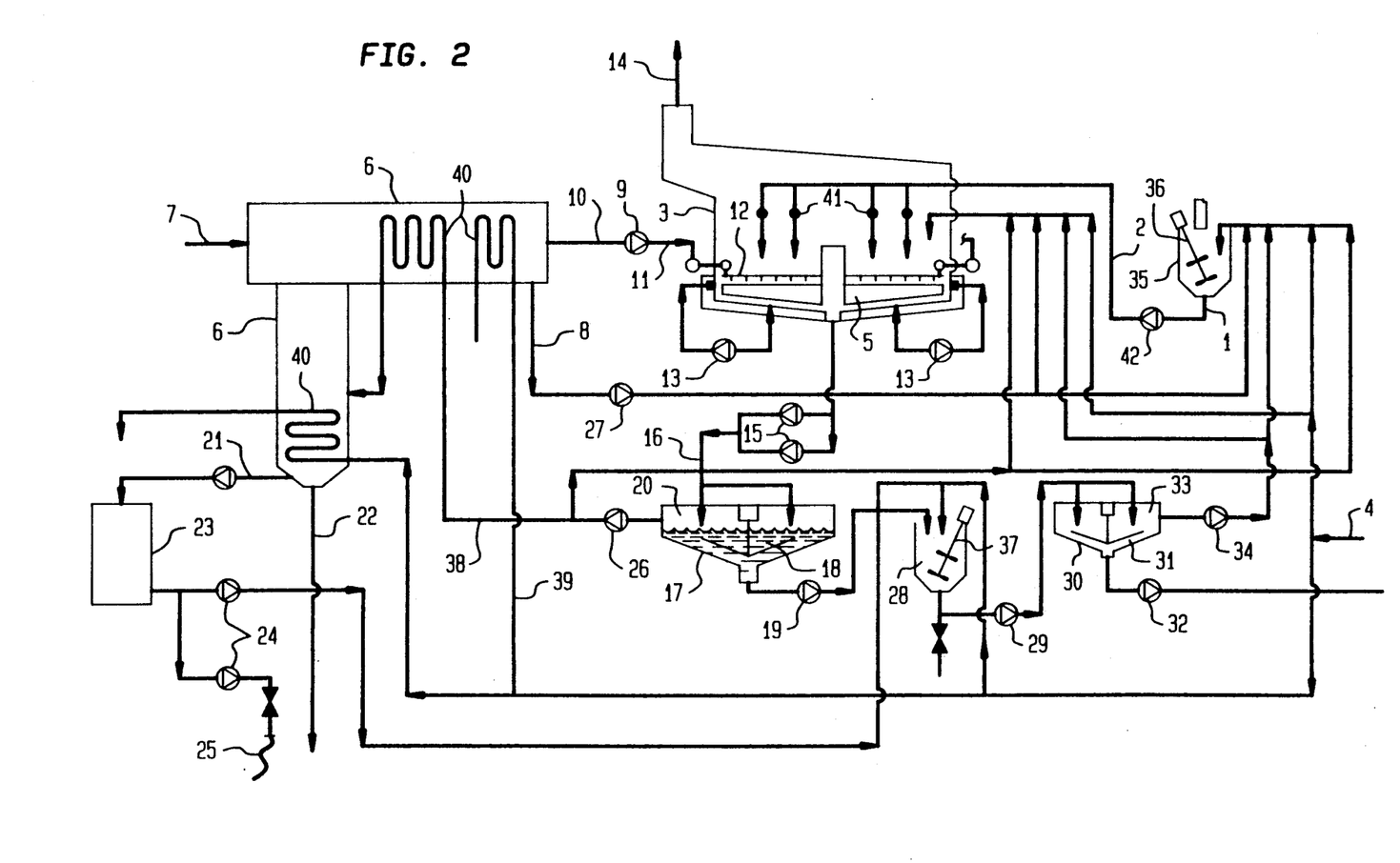
FIG. 2 is a flow diagram showing the mode of operation of the apparatus shown in FIG. 1.

FIG. 2 shows the operation of the preferred embodiment of the system in diagrammatic form. FIG. 1 shows in greater detail the treatement of the ash by the exhaust gas containing one or more of the oxides of sulfur, nitrogen, carbon, the halogens, or acidic compounds of halogens and the settling of the treated product. In the accompanying figures, as described herein, like-numbered apparatus elements are the same.

Referring now to FIG. 2, ash from a suitable source (not shown) and water from pipe 4 (outside water supply, not shown) and from pumps 27 (condensed exhaust gas moisture), 26 and 34 are mixed by mixer 36 in mixing tank 35 to produce a slurry which is pumped through pipe 1 by pump 42 via pipe 2 to inlet pipes 41 where it is released into treatment tank 3 as a dilute slurry 5. Additional water from the outside water supply may be added through pipe 4 in treatment tank 3. Outside water may also be delivered by pipe 4 to dilution tank 28 and by connection to pipe 39 to coils 40 in heat exchanger-crystallization unit 6. The ash is obtained from a source such as a generating plant fired by biomass or an incinerator fired by waste material. An exhaust gas stream from a cement kiln, incinerator or boiler (not shown) containing one or more of the oxides of sulfur, nitrogen, carbon, and the halogens, or acidic compounds of halogens, enters heat exchanger crystallization unit 6 through inlet 7 from which it emerges, after cooling and dehumidifying, as cooled exhaust. Condensed exhaust gas moisture is collected in the heat exchanger crystallization unit 6 and conveyed by pump 27 to the mixing tank 35 or to the treatment tank 3 through pipe 8. The exhaust then travels to compressor 9 through pipe 10 and is delivered via pipe 11 to distribution pipes 12 in the bottom of the treatment tank 3. To prevent settling of the solids to the bottom of treatment tank 3, the slurry may be stirred or recirculated by suitable means, for example by recirculation pump or pumps 13.

The exhaust gas contacts slurry 5 of ash and water and emerges from the tank top as scrubbed exhaust 14. Slurry 5, in the form of a mixture of treated solid, water and dissolved materials, is pumped by pump or pumps 15 via pipe 16 to the settling tank 17 where the settled solids 18 ar in turn pumped out by pump 19 while the water 20, comprising a solution laden with dissolved salts, is pumped by pump 26 through pipe 38 back to the coils of heat exchanger crystallization unit 6 to provide cooling for the input exhaust gas. The water from salt solution 20 is evaporated to a vapor in heat exchanger-crystallization unit 6 and released via pipe 21 into the atmosphere or recondensed to a liquid to recapture the latent heat for reuse and discharged into distilled water storage tank 23. The salts from the salt solution 20 are concentrated and/or precipitated and collected from the heat exchanger crystallization unit 6 via pipe 22. The cationic components of the collected salts are principally calcium, potassium, magnesium, and sodium. The anionic components of the salts are principally sulfate, carbonate and nitrate. The actual composition of the salts will depend on the initial composition of the ash to be treated and on the composition of the exhaust gas to be scrubbed.

Distilled water for use in the system is stored in a distilled water storage tank 23 from which it may be pumped as needed to other locations by pumps 24 and drained when desired to drain 25. Distilled water from the heat exchanger crystallization unit 6 is fed to the tank 23 through line 21. The salt solution 20 from settling tank 17 is pumped by pump 26 through pipe 38 to the heat exchanger crystallization unit 6 and through coils 40 as shown at the upper left-hand side of the drawing of FIG. 2. There it is concentrated, yielding precipitated salts or a concentrated salt solution in pipe 22, the vapor being either released to atmosphere or fed through pipe 21 back to the distilled water storage tank 23. Solids from the bottom of settling tank 17 may be withdrawn by pump 19 and fed to dilution tank 28 where they are diluted by water from tank 23 and stirred by stirrer 37 and thence removed by pump 29 to a second settling tank 30 from which the settled solids 31 are pumped by pump 32. Where dissolved solids are not necessarily separated from the settled solids, the dilution and second settling step may be omitted. In the case of use of the invention in a cement plant, these settled solids are usable as raw feed for the kiln; in the case of a boiler installation, wherein ash has been used as the neutralizing agent, the solids, which are now benign, may be used for raw feed for a cement plant if the composition is suitable or may go to waste removal facilities.

Tank 30 at this point also contains solution 33, from which solids 31 have settled. Solution 33 may be pumped by pump 34 either to the primary mixing tank 35 (shown in FIG. 2 but not shown in FIG. 1) or directly to treatment tank 3 as part of the process water supply. In the primary mixing tank 35, it may be added to the cement dust or ash along with water to produce a slurry mixed by stirrer 36 of the desired consistency which is then fed to pump 42 through pipe 1 and thence through line 2 into treatment tank 3 to be reacted with the exhaust gas stream entering through pipe 11 and exiting, after neutralization, through outlet 14 to the stack. As previously described, the slurry and precipitating solids are continuously agitated in tank 3 by being recirculated by pumps 13. As can be seen from the schematic, additional water can be added to the slurry in tank 3 from source 4 as well as from other parts of the system through the piping shown. The exhaust gas stream is preferably reacted with the basic solution in the slurry (produced by mixing the cement dust or ash with water) by being bubbled through it from ports in the distribution pipes 12 in the bottom part of tank 3.

Ash derived from biomass burning systems may contain unburned carbon which, in some situations, will float in water. The process illustrated can be modified, if desired, to allow removal of the carbon. Water 20 carrying unburned carbon may be pumped from the surface of the settling tank 17 to be filtered or otherwise conventionally treated by means not shown to remove the carbon and is then returned to the process.

If the solution 20 containing dissolved akali and alkaline earth metal salts has been fouled with unwanted particulate matter it may delivered to a filtration unit (not shown) or otherwise cleansed before being returned to the heat exchanger 6.

The heat exchanger 6 is a dual purpose heat exchanger-crystallization unit of a known type which will extract heat from the exhaust gas and use that heat, including latent heat derived from condensation of the exhaust gas moisture, to evaporate water from salt solution 20. The salts crystallized from salt solution 20 are then recovered as solid material.

THE APPARATUS

The whole system is created from well known parts combined by standard methods. For example, typically the treatment tank 3 may have a volume of one million gallons (3,800,000 liters) and be provided with gas distribution and stirring means; the settling tank 17 may have a volume of one hundred thousand gallons (380,000 liters), both being constructed from stainless steel, or other suitable materials, such as rubber, which can tolerate highly alkaline or acidic solutions.

WORKING PRINCIPLE

The basic working principle of this invention is recombination and reaction of two wastes produced during burning to provide mutual neutralization of the wastes. One waste stream comprises the gasses and gaseous oxides which produce acidic solutions in water and the other particulate matter, namely ash from a biomass or industrial or municipal waste burning facility, which produces basic solutions in water. According to the invention, one is reacted with the other to achieve the desired result.

After partial dissolution in water in a treatment tank 3, the two wastes react to neutralize each other. In the case of the ash, the process provides for reaction of or removal of the caustic components, thus rendering what remains as neutral solids suitable for disposal as non-hazardous waste. At the same time, the exhaust gas passing through the slurry in the treatment tank 3 is cleansed of a significant portion of the compounds of the halogens and oxides of sulfur, nitrogen and halogens by forming salts of these components.

EXAMPLE

Exhaust gas from, e.g. a boiler, may be drawn or fed through duct 7 to heat exchanger 6 at a rate of 200,000 cubic feet (6000 m$^3$) per minute by fan or compressor 9. The exhaust gas is variable in composition, but may contain roughly 10% water, 15% carbon dioxide, 65% nitrogen, 10% oxygen and 500 to 1000 ppm nitrogen oxides and 100 to 1000 ppm sulfur dioxide. In heat exchanger 6 the exhaust gas is cooled and water is condensed, resulting in a decrease in flow volume. The exhaust gas is then fed through pipe 11 to distribution pipes 12 and allowed to react with slurry 5 where the halogens and the oxides of sulfur, nitrogen, carbon and halogens are reacted.

Ash may be introduced to treatment tank 3, for example, at a rate of eight to twelve tons (7200 to 10,800 kg) per hour dry weight. Water is added to produce a dilute slurry of up to 95% water content. The slurry water content is determined by the initial concentration of alkali and alkaline earth metal salts or other metal salts in the ash and on the desired degree of removal of these salts from the residue.

After reaction with the exhaust gas, the slurry of treated ash is pumped at a rate of approximately 200 gallons (760 liters) per minute to settling tank 17. In this tank the solids settle to form a slurry 18 of approximately 35% water and 65% solids, beneath a solution 20 of water and soluble salts dissolved during treatment. This solution is pumped by pump 26 to heat exchanger 6 at approximately 200 gallons (760 liters) per minute to provide cooling for the exhaust gas and to evaporate the water therefrom to produce the by-product salts. Any floating carbon can be removed as previously explained. The by-product salts, removed via pipe 22, are produced at a rate of approximately five to twenty tons (4500 to 18,000 kg) per day. The by-product salts include potassium sulfate, calcium carbonate, and other salts with cationic components including potassium, calcium, magnesium, and sodium and anionic components including carbonate, sulfate, and nitrate. A portion of the nitrate oxidizes the sulfite to sulfate.

While there has herein been disclosed and described a presently preferred method and apparatus for practicing the invention, it will nevertheless be understood that the same is by way of illustration and not by way of limitation, and it is intended that the scope of the invention be limited only by the proper interpretation to be afforded the appended claims.

I claim:

1. A method of treatment of an exhaust gas stream containing as pollutants at least one of the acidic oxides of sulfur, nitrogen, carbon, and halogens and acidic halogen compounds, whose temperature exceeds the dew point of the gas, for producing scrubbed exhaust and useful or benign by-products, said method comprising:

providing a basic aqueous slurry of ash, said ash containing alkali and alkaline earth metal salts, contacting the exhaust gas stream with the slurry in a manner to scrub said exhaust gas stream and to cause the pollutants therein to react with the water in the slurry to produce acids, allowing said acids to react with any oxides, hydroxides and carbonates of alkali and alkaline metal salts in said slurry, thereby to produce a solution with soluble alkali metal salts and a precipitate of any insoluble alkali and alkaline earth metal salts comprising at least one of halogen compounds, carbonate, sulfate, sulfite, nitrate, and nitrite of calcium, magnesium, potassium and sodium in said slurry, recovering said precipitate from said solution, evaporating said solution freed of said precipitate, recovering in solid form any soluble alkali and alkaline earth metal salts present in said solution, and expelling the scrubbed exhaust gas stream.

2. A method according to claim 1 wherein potassium and sodium are the prime reactants in said ash that combine with sulfur compounds in the flue gas to produce a solution containing alkali metal sulfates, and a precipitate comprising alkaline earth carbonates is formed from carbon dioxide scrubbed from the flue gas.

3. A method according to claim 1 wherein water vapor obtained from evaporating said solution is condensed to form distilled water which is returned as needed for use in said method.

4. A method according to claim 1 wherein the heat for evaporating said solution is derived in part from each of the exhaust gas stream, the latent heat of moisture condensed upon cooling said gas stream, the hydration reaction between ash and water, and from compressing said gas stream prior to reacting it with said slurry.

5. A method according to claim 1 wherein said contacting of said basic slurry and said exhaust gas stream is effected by bubbling said gas stream through said slurry.

6. A method of treating ash and an exhaust gas stream containing acid forming pollutants whose temperature exceeds the dew point of the gas, to chemically modify the ash and to scrub the exhaust, the method comprising:

cooling said gas stream in a manner to remove and recover heat therefrom, thereafter providing an alkali-containing basic scrubbing slurry comprising the ash and water, contacting the cooled gas stream with said slurry comprising the ash and water to cause pollutants in the gas stream to react with water in the slurry to form acids and allowing the acids to react with said slurry to form a mixture of settleable solids and a liquid solution containing dissolved solids, separating from the resulting mixture said settleable solids and said liquid solution containing dissolved solids, heating the liquid solution containing dissolved solids using only recovered heat collected during said cooling of said gas stream, and recovering in solid form said dissolved solids.

7. The method according to claim 6 further comprising evaporating liquid from the liquid solution containing dissolved solids and recondensing the evaporated liquid.

* * * * *

UNITED STATES PATENT AND TRADEMARK OFFICE
CERTIFICATE OF CORRECTION

PATENT NO. : 5,100,633
DATED : March 31, 1992
INVENTOR(S) : Garrett L. Morrison

It is certified that error appears in the above-identified patent and that said Letters Patent is hereby corrected as shown below:

Col. 1, line 20, delete "east", insert --least--

Col. 2, line 27, delete "by product", insert --by-product--

Col. 5, line 19, delete "and the halogens", insert --and halogens--

Col. 6, line 50, delete "may", insert --may be--

Signed and Sealed this

Twentieth Day of July, 1993

Attest:

MICHAEL K. KIRK

*Attesting Officer*     Acting Commissioner of Patents and Trademarks